May 14, 1940.  R. L. BECKMAN  2,200,686
MULTIPLE POWER TRANSMISSION DRIVE
Filed March 14, 1938
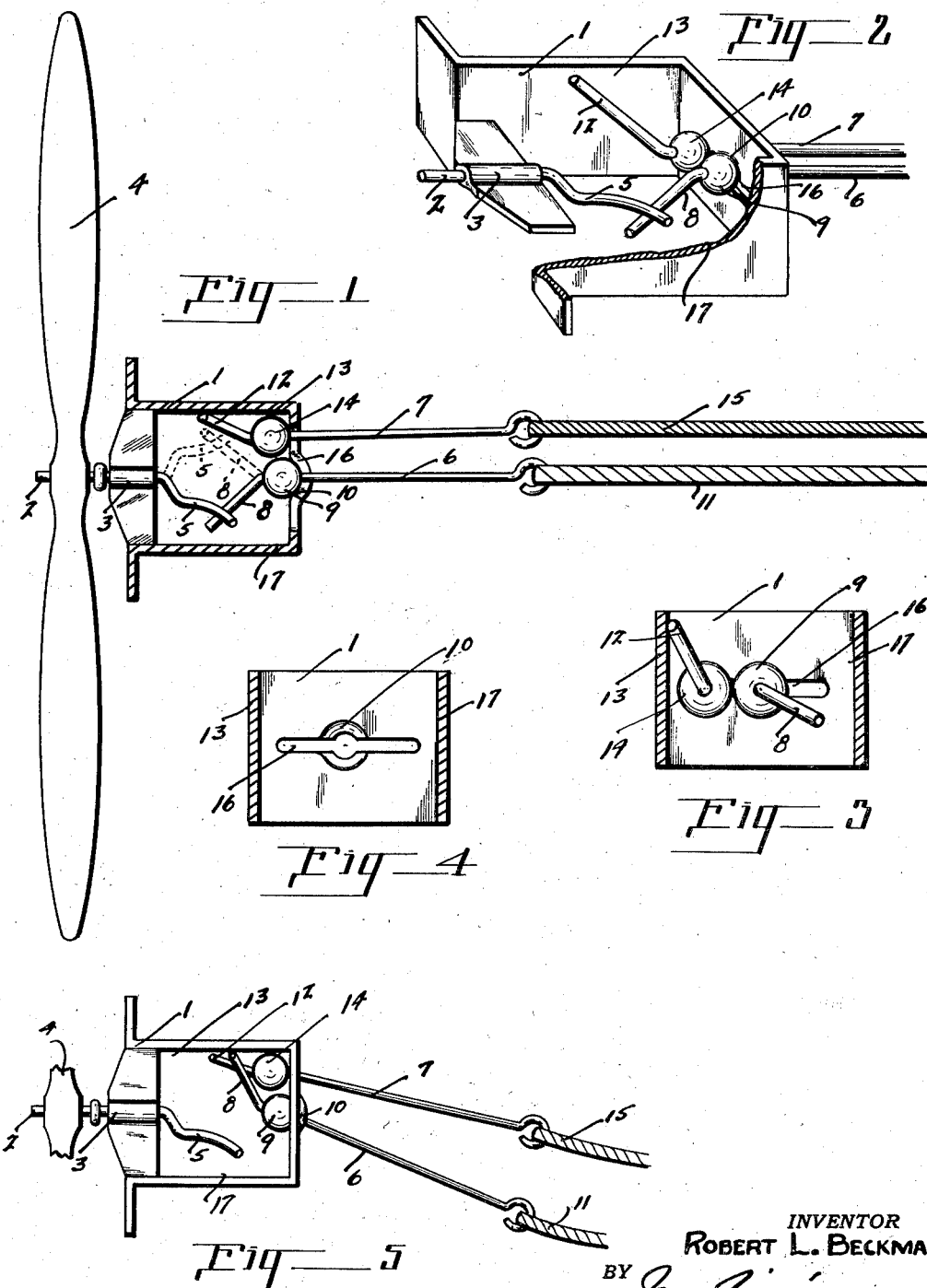
INVENTOR
ROBERT L. BECKMAN
BY
ATTORNEY Patented May 14, 1940

2,200,686

UNITED STATES PATENT OFFICE 2,200,686

MULTIPLE POWER TRANSMISSION DRIVE

Robert Lawrence Beckman, Eugene, Oreg.

Application March 14, 1938, Serial No. 195,906

11 Claims. (Cl. 185—40)

This invention relates to power and transmission drives and is particularly adapted to be used in connection with toy airplanes and the like.

The primary object of my invention is to drive a shaft by two or more power or motive means, first by one separately and then from the other power means separately, when one power means leaves off the other comes into effect.

In present day construction, especially model airplanes and boats, it is the custom to use rubber bands and the like for driving the propelling means. In some cases they use a multiple of bands but they all run down simultaneously and it is the object of my invention to use a number of motors, such as rubber bands, first transferring the energy from one band or motor into the propelling means or driven shaft for a predetermined amount of time, then stopping this motor after which another motor or rubber band will come into action for a period of time driving the propelling means or driven shaft, thereafter the previous motor or rubber band will again come into play driving the propelling means, but in any event there is just one of the motors working at any one time.

From the above description it will be readily understood that the duration of power output can be greatly extended.

Another object of this invention is to provide, especially in model airplanes and boats, free wheeling of the propeller after the motive power has run down.

A further object of my invention is to lock the propeller and motive means by simply reversing the direction of the propeller by hand.

These and other incidental objects will be apparent in the drawing, specification and claims to follow.

Referring to the drawing:

Figure 1 is a side view of the motor mechanism embodying my invention as related to toy airplanes.

Figure 2 is a perspective view of my new and improved power transmission.

Figure 3 is a sectional view of my transmission, looking towards the driving shafts.

Figure 4 is the same view as Figure 3, with the driving shafts removed.

Figure 5 is a fragmentary side view of my transmission illustrating the free wheeling principle.

In the drawing:

1 is a main frame or body portion of my transmission having a driven shaft 2 mounted within a suitable bearing bracket 3. This shaft may have a propeller 4 mounted thereon at its outer end, on its opposite end is a crank 5. This crank is revolved by the driving shafts 6 and 7; only one of these shafts drive at any one time.

Referring to Figure 1, the shaft 6 is in position for driving the shaft 2. The crank arm 8 is shown engaged with the crank arm 5 of the driven shaft. A ball like bearing 9 is shown seated in the socket bearing 10 of the main frame 1, holding the shaft 6 in line with the driven shaft 2.

A twisted band 11 drives the shaft 6, although any suitable driving means may be used. The driving shaft 7 is shown in a position off to one side, as in Figures 1, 2 and 3. Its crank 12 is shown bearing against the wall 13 of the main frame, while its ball like bearing 14 is held in the position shown by the bearing 9 of the operating shaft 6. The rubber band 15 is tending to revolve the shaft 7 but cannot do so due to the fact that the crank 12 is prevented from turning. When the rubber band 11 has driven the shaft 6 and drive shaft 2 for a period of time it expends a portion of its power, after which the rubber band 15, being wound tighter and being more powerful than the band 11, will exert sufficient turning power to cause the crank 12 to shift the bearing 14 towards the bearing 9, crowding the bearing 9 out of the socket 10 and shifting the shaft 6 across the slot 16 towards the wall 17 placing it in the same relative position as shaft 7 appears in the drawing, but on the opposite side, the crank 8 will then rest against the wall 16 preventing the shaft 6 from turning, simultaneously therewith the bearing ball 14 of shaft 7 takes the former position of the bearing 9 and the shaft 6 within the socket 10 and immediately the shaft 7 and its crank 12 engage the crank 5 of the driven shaft 2, delivering power thereto.

When the rubber band 15 becomes weakened below the driving band 11, the bearing ball 9 will force the ball 14 out of the socket 10, by the action of the crank 8 pressing against the wall 17 and forcing the same to take its former position, as shown in Figures 1, 2 and 3. This action goes on until both power means 11 and 15 have been completely unwound, at which time they will assume a position as shown in Figure 5 forcing the cranks 8 and 12 out of engagement with the crank 5 which will allow the propeller 4 to revolve freely while the model airplane is making a landing. This is a very desirable condition.

I do not wish to be limited to this particular form of embodiment, as other forms may be used, still coming within the scope of the claims to follow.

What is claimed to be new is:

1. A power drive for toys of the type including a driven element, said power drive including substantially duplicate driving elements each independently tensioned for operation and either capable of actuating the driven element, and means whereby the driving elements may automatically displace each other in repeated succession in driving cooperation with the driven element as the operating tension of the active driving element falls below the operating tension of the inactive driving element.

2. A power drive for toys of the type including a driven element, said power drive including substantially duplicate driving elements each of which may operate the driven element, means for tensioning each of the driving elements independently, and means whereby the active driving element may be automatically and repeatedly displaced by the inactive driving element when the operating tension of the active driving element falls below the operating tension of the inactive driving element, and means for holding the inactive driving element against release of its tension while inactive.

3. A power drive for toys of the type including a driven element, said drive including duplicate driving elements independently tensioned for driving function, and means whereby the respective driving elements may be automatically positioned in repeated succession for driving cooperation of the driven element in accordance with the relative operating tension of said driving elements.

4. In combination with a toy including a propeller, a driven crank carried by the propeller, duplicate driving cranks mounted adjacent the driven crank, means whereby either of the driving cranks may occupy a position to cooperate with the driven crank for driving cooperation, and independent tensioning means for each of the driving cranks, said driving cranks being mounted for movement to permit the then active driving crank to be repeatedly displaced by the then inactive driving crank as the operating tension of the former falls below that of the latter.

5. A toy including a propeller, a driven crank therefor, a casing in which the driven crank is arranged, driving cranks mounted in the casing either of which may cooperate with the driven crank for operating the propeller, independent tensioning means for each driving crank for operating said crank, said casing being formed with a slot in which the driving cranks are mounted for relative movement, the slots permitting the active driving crank to be displaced by the inactive driving crank as the tension of the active driving crank falls below that of the inactive driving crank, the displacing movement of the inactive driving crank serving to place such crank in driving cooperation with the driven crank.

6. A toy including a propeller, a driven crank carried by the propeller, a housing enclosing the driven crank, driving cranks arranged in the housing, a rubber band or bands for each driving crank to be tensioned by twisting, the housing being formed to permit lateral movement of the driving cranks with the active driving crank positioned in line with the driven crank and cooperating therewith for driving purposes and the inactive driving crank arranged adjacent one wall of the housing and prevented from movement under its tensioning means by a wall of the housing, the inactive driving crank incident to its tension displacing the active driving crank through lateral movement when the tension of the active driving crank falls below that of the inactive driving crank.

7. A construction as defined in claim 6, wherein the automatic displacement of the active driving crank by the inactive driving crank continues automatically in successive displacements as the tension of the active driving crank falls below that of the inactive driving crank.

8. A construction as defined in claim 6, wherein the active driving crank includes spherical elements arranged within the housing and wherein the housing is centrally formed with a depression to position the active driving crank while in active driving connection with the driven crank.

9. A toy including a propeller, a driven crank connected with the propeller, a casing within which the driven crank is mounted, duplicate driving cranks mounted within the casing and each including a ball terminal, the end wall of the casing being formed with a slot, rod projections from the ball terminals of the driving cranks extending through the slot, and independent driving means for each driving crank of the type tensioned by twisting or the like for driving action, the end of the casing formed with the slot including a depression to position the ball of the active driving crank in position for compelling the active driving crank to cooperate with the driven crank, the ball of the active driving crank holding the ball of the inactive driving crank laterally of the depression to prevent movement of the inactive driving crank by a wall of the casing, the tension of the driving means of the inactive driving crank tending to move the inactive driving crank to laterally displace the active driving crank when the tension of the operating means of such active driving crank falls below that of the inactive driving crank.

10. A construction as defined in claim 9, wherein the driving cranks are alternately active and inactive in automatic succession incident to the variation in the tension of their operating means until the power of such operating means of both driving cranks is exhausted.

11. An energy transmitter having a driven element, a plurality of driving elements, the total operating period of the driven element being the summation of each and every driving element operating period or periods, the driving elements repeatedly displacing one another in driving cooperation with the driven element to maintain operation until all of the stored driving energy of each driving element has been transferred to the driven element.

ROBERT LAWRENCE BECKMAN.